(12) United States Patent
Dollens

(10) Patent No.: US 8,260,689 B2
(45) Date of Patent: Sep. 4, 2012

(54) METHOD AND SYSTEM FOR MANAGING AND DISPLAYING PRODUCT IMAGES

(76) Inventor: Joseph R. Dollens, Chicago, IL (US)

(*) Notice: Subject to any disclaimer, the term of this patent is extended or adjusted under 35 U.S.C. 154(b) by 739 days.

(21) Appl. No.: 11/820,342

(22) Filed: Jun. 19, 2007

(65) Prior Publication Data

US 2008/0010169 A1 Jan. 10, 2008

Related U.S. Application Data

(60) Provisional application No. 60/819,456, filed on Jul. 7, 2006.

(51) Int. Cl.
G06Q 30/00 (2006.01)

(52) U.S. Cl. ............. 705/27.2; 705/26.1; 705/27.1; 382/276; 382/302; 345/619

(58) Field of Classification Search .......... 705/26, 705/27, 26.1, 27.1, 27.2; 382/276, 302; 345/619
See application file for complete search history.

(56) References Cited

U.S. PATENT DOCUMENTS

| | | | |
|---|---|---|---|
| 4,779,135 A | 10/1988 | Judd | |
| 5,181,745 A | 1/1993 | Jacobsen | |
| 5,451,998 A | 9/1995 | Hamrick | |
| 5,680,528 A | 10/1997 | Korszun | |
| 5,715,331 A * | 2/1998 | Hollinger | 382/199 |
| 5,726,898 A | 3/1998 | Jacobs | |
| 5,768,142 A | 6/1998 | Jacobs | |
| 5,848,399 A | 12/1998 | Burke | |
| 5,897,622 A | 4/1999 | Blinn | |
| 5,970,471 A | 10/1999 | Hill | |
| 5,983,200 A | 11/1999 | Slotznick | |
| 5,986,670 A | 11/1999 | Dries | |
| 6,026,376 A * | 2/2000 | Kenney | 705/27 |
| 6,026,377 A | 2/2000 | Burke | |
| 6,058,373 A | 5/2000 | Blinn | |
| 6,108,640 A | 8/2000 | Slotznick | |
| 6,304,855 B1 * | 10/2001 | Burke | 705/27 |
| 6,466,975 B1 | 10/2002 | Sterling | |
| 6,484,150 B1 | 11/2002 | Blinn | |
| 6,532,345 B1 | 3/2003 | Gluck | |
| 6,587,835 B1 | 7/2003 | Treyz | |
| 6,625,581 B1 | 9/2003 | Perkowski | |
| 6,629,135 B1 | 9/2003 | Ross, Jr. | |

(Continued)

OTHER PUBLICATIONS

GeoExpress 4.0 Brochure, www.calcad.com/ccs/Products/Docs/ge_brochure.pdf, dated Jan. 12, 2005 [retrieved from www.archive.org on Mar. 11, 2010].*

(Continued)

Primary Examiner — Jeffrey A Smith
Assistant Examiner — Anne Georgalas
(74) Attorney, Agent, or Firm — Lesavich High-Tech Law Group, P.C.; Stephen Lesavich (57) ABSTRACT

A method and system displaying and managing images of consumer products. Plural consumer products are selected to display in a virtual display environment. A layout for the selected plural consumer products is determined. An image of a shelf layout on which consumer products are displayed is created. The created image allows progressive resolution on the selected plural consumer products that appear in the image. The created image is displayed via a communications network. The created image provides a virtual shopping experience is similar to a shopping experience in an actual retail store.

19 Claims, 7 Drawing Sheets

U.S. PATENT DOCUMENTS

| | | |
|---|---|---|
| 6,634,550 B1 | 10/2003 | Walker et al. |
| 6,658,424 B1 | 12/2003 | Rahmer et al. |
| 6,698,943 B2 | 3/2004 | Gluck |
| 6,728,706 B2 | 4/2004 | Aggarwal |
| 6,751,620 B2 * | 6/2004 | Orbanes et al. .................. 1/1 |
| 6,879,322 B2 | 4/2005 | Iida |
| 6,912,293 B1 | 6/2005 | Korobkin |
| 6,917,853 B2 | 7/2005 | Chirnomas |
| 6,937,755 B2 | 8/2005 | Orpaz |
| 6,961,712 B1 | 11/2005 | Perkowski |
| 6,975,937 B1 | 12/2005 | Kantarjiev |
| 6,976,028 B2 | 12/2005 | Fenton |
| 6,980,962 B1 | 12/2005 | Arganbright |
| 6,985,876 B1 | 1/2006 | Lee |
| 6,985,897 B1 | 1/2006 | Abrahams |
| 6,993,572 B2 | 1/2006 | Ross, Jr. |
| 7,003,526 B1 | 2/2006 | Lee |
| 7,016,865 B1 | 3/2006 | Weber |
| 7,065,520 B2 | 6/2006 | Langford |
| 7,077,581 B2 | 7/2006 | Gluck |
| 7,084,838 B2 | 8/2006 | Yoon |
| 7,091,931 B2 | 8/2006 | Yoon |
| 7,092,903 B2 * | 8/2006 | Chow .............................. 705/27 |
| 7,111,252 B1 * | 9/2006 | Harris ............................ 715/851 |
| 7,127,261 B2 | 10/2006 | Van Erlach |
| 7,127,415 B1 | 10/2006 | Verchere |
| 7,139,006 B2 | 11/2006 | Wittenburg |
| 7,139,721 B2 | 11/2006 | Borders |
| 7,149,754 B2 | 12/2006 | Miller |
| 7,149,984 B1 | 12/2006 | Rock |
| 7,156,306 B1 | 1/2007 | Kenney |
| 7,158,878 B2 * | 1/2007 | Rasmussen et al. .......... 701/208 |
| 7,168,617 B2 | 1/2007 | Walker |
| 7,177,825 B1 | 2/2007 | Borders |
| 7,178,108 B1 | 2/2007 | Workman |
| 7,188,333 B1 | 3/2007 | LaMotta |
| 7,190,825 B2 | 3/2007 | Yoon |
| 7,196,733 B2 | 3/2007 | Aratani |
| 7,197,479 B1 | 3/2007 | Franciscus de Heer |
| 7,216,092 B1 | 5/2007 | Weber |
| 7,228,283 B1 | 6/2007 | Hornstein |
| 7,233,914 B1 | 6/2007 | Wijaya |
| 7,249,708 B2 | 7/2007 | McConnell |
| 7,269,571 B2 | 9/2007 | Kar |
| 7,272,577 B1 | 9/2007 | LaMotta |
| 7,283,650 B1 | 10/2007 | Sharma |
| 7,284,007 B1 | 10/2007 | Franciscus de Heer |
| 7,308,423 B1 | 12/2007 | Woodward |
| 7,599,790 B2 * | 10/2009 | Rasmussen et al. .......... 701/532 |
| 7,616,834 B2 * | 11/2009 | Kramer et al. ................. 382/276 |
| 2001/0029465 A1 | 10/2001 | Strisower |
| 2001/0037373 A1 | 11/2001 | Cambridge |
| 2001/0047285 A1 | 11/2001 | Borders |
| 2001/0050687 A1 | 12/2001 | Iida |
| 2002/0002511 A1 | 1/2002 | Yim |
| 2002/0004735 A1 | 1/2002 | Gross |
| 2002/0035512 A1 | 3/2002 | Pavlik |
| 2002/0055833 A1 | 5/2002 | Sterling |
| 2002/0065737 A1 | 5/2002 | Aliabadi |
| 2002/0071604 A1 | 6/2002 | Orpaz |
| 2002/0072993 A1 * | 6/2002 | Sandus et al. ................... 705/26 |
| 2002/0077930 A1 | 6/2002 | Trubey |
| 2002/0080163 A1 | 6/2002 | Morey |
| 2002/0082952 A1 | 6/2002 | Johnston |
| 2002/0087431 A1 | 7/2002 | Morishima |
| 2002/0087583 A1 | 7/2002 | Morgan |
| 2002/0099622 A1 | 7/2002 | Langhammer |
| 2002/0103737 A1 | 8/2002 | Briere |
| 2002/0120674 A1 | 8/2002 | Son |
| 2002/0138481 A1 | 9/2002 | Aggarwal |
| 2002/0155878 A1 | 10/2002 | Lert |
| 2002/0158916 A1 | 10/2002 | Gusler |
| 2002/0169801 A1 | 11/2002 | Barnes |
| 2002/0184104 A1 | 12/2002 | Litman |
| 2002/0184359 A1 | 12/2002 | Kaneko |
| 2002/0194081 A1 | 12/2002 | Perkowski |
| 2002/0194195 A1 | 12/2002 | Fenton |
| 2002/0198785 A1 | 12/2002 | Chae |
| 2002/0198791 A1 | 12/2002 | Perkowski |
| 2003/0009392 A1 | 1/2003 | Perkowski |
| 2003/0018777 A1 | 1/2003 | Miller |
| 2003/0033237 A1 | 2/2003 | Bawri |
| 2003/0083949 A1 | 5/2003 | Kar |
| 2003/0083955 A1 | 5/2003 | Ookura |
| 2003/0083961 A1 | 5/2003 | Bezos |
| 2003/0093321 A1 | 5/2003 | Bodmer |
| 2003/0098862 A1 * | 5/2003 | Hunt et al. .................... 345/418 |
| 2003/0103070 A1 | 6/2003 | Tiongson |
| 2003/0107643 A1 | 6/2003 | Yoon |
| 2003/0107645 A1 | 6/2003 | Yoon |
| 2003/0107646 A1 | 6/2003 | Yoon |
| 2003/0108236 A1 | 6/2003 | Yoon |
| 2003/0112326 A1 | 6/2003 | Yoon |
| 2003/0112328 A1 | 6/2003 | Yoon |
| 2003/0112508 A1 | 6/2003 | Yoon |
| 2003/0113012 A1 | 6/2003 | Yoon |
| 2003/0117395 A1 | 6/2003 | Yoon |
| 2003/0117396 A1 | 6/2003 | Yoon |
| 2003/0120534 A1 | 6/2003 | Giacchetti |
| 2003/0120562 A1 | 6/2003 | Clark |
| 2003/0122925 A1 | 7/2003 | Yoon |
| 2003/0126018 A1 | 7/2003 | LaMotta |
| 2003/0126139 A1 | 7/2003 | Lee |
| 2003/0139975 A1 | 7/2003 | Perkowski |
| 2003/0139996 A1 | 7/2003 | D'Antoni |
| 2003/0142236 A1 | 7/2003 | Aratani |
| 2003/0167206 A1 | 9/2003 | Shirai |
| 2003/0174178 A1 | 9/2003 | Hodges |
| 2003/0177072 A1 | 9/2003 | Bared |
| 2003/0200156 A1 | 10/2003 | Rozeman |
| 2003/0204447 A1 | 10/2003 | Dalzell |
| 2003/0204449 A1 | 10/2003 | Kotas |
| 2003/0212596 A1 | 11/2003 | DiPaolo |
| 2003/0227484 A1 | 12/2003 | Hao |
| 2004/0015408 A1 | 1/2004 | Rauen |
| 2004/0044627 A1 | 3/2004 | Russell |
| 2004/0049728 A1 | 3/2004 | Langford |
| 2004/0114801 A1 * | 6/2004 | Boose et al. .................. 382/180 |
| 2004/0140352 A1 | 7/2004 | Walker |
| 2004/0143585 A1 | 7/2004 | Antener |
| 2004/0144472 A1 | 7/2004 | Cowie |
| 2004/0145660 A1 | 7/2004 | Kusaka |
| 2004/0148366 A1 | 7/2004 | Ross |
| 2004/0150657 A1 | 8/2004 | Wittenburg |
| 2004/0153371 A1 | 8/2004 | Razumov |
| 2004/0153378 A1 | 8/2004 | Perkowski |
| 2004/0186620 A1 | 9/2004 | Chirnomas |
| 2004/0199575 A1 | 10/2004 | Geller |
| 2004/0204063 A1 | 10/2004 | Van Erlach |
| 2004/0210479 A1 | 10/2004 | Perkowski |
| 2004/0232227 A1 | 11/2004 | Kusakawa |
| 2004/0250083 A1 | 12/2004 | Schwab |
| 2004/0260618 A1 | 12/2004 | Larson |
| 2005/0004838 A1 | 1/2005 | Perkowski |
| 2005/0010475 A1 | 1/2005 | Perkowski |
| 2005/0021472 A1 | 1/2005 | Gettman |
| 2005/0022139 A1 | 1/2005 | Gettman |
| 2005/0030309 A1 | 2/2005 | Gettman |
| 2005/0065855 A1 | 3/2005 | Geller |
| 2005/0071216 A1 | 3/2005 | Yoshitake |
| 2005/0086612 A1 | 4/2005 | Gettman |
| 2005/0097005 A1 | 5/2005 | Fargo |
| 2005/0102199 A1 | 5/2005 | Lee |
| 2005/0131837 A1 | 6/2005 | Sanctis |
| 2005/0156028 A1 | 7/2005 | Chirnomas |
| 2005/0162419 A1 | 7/2005 | Kin |
| 2005/0165663 A1 | 7/2005 | Razumov |
| 2005/0167487 A1 | 8/2005 | Conlon |
| 2005/0188057 A1 | 8/2005 | Joo |
| 2005/0192873 A1 | 9/2005 | Roche |
| 2005/0203724 A1 | 9/2005 | Orpaz |
| 2005/0203809 A1 | 9/2005 | Stone |
| 2005/0229227 A1 | 10/2005 | Rogers |
| 2005/0246627 A1 | 11/2005 | Sayed |
| 2005/0251456 A1 | 11/2005 | Perkowski |
| 2005/0285876 A1 * | 12/2005 | Balaga et al. .................. 345/629 |
| 2006/0011716 A1 | 1/2006 | Perkowski |

| | | | |
|---|---|---|---|
| 2006/0050014 A1 | 3/2006 | Yoon | |
| 2006/0085250 A1 | 4/2006 | Kantarjiev | |
| 2006/0085277 A1 | 4/2006 | Arnston | |
| 2006/0109283 A1 | 5/2006 | Shipman | |
| 2006/0143095 A1 | 6/2006 | Sandus | |
| 2006/0149721 A1 | 7/2006 | Langford | |
| 2006/0175403 A1 | 8/2006 | Fossen McConnell | |
| 2006/0178947 A1 | 8/2006 | Zsigmond | |
| 2006/0179033 A1 | 8/2006 | Stanke | |
| 2006/0179062 A1 | 8/2006 | Weber | |
| 2006/0179076 A1 | 8/2006 | Weber | |
| 2006/0190333 A1 | 8/2006 | Choi | |
| 2006/0190341 A1* | 8/2006 | Riley et al. | 705/26 |
| 2006/0190348 A1 | 8/2006 | Ofer | |
| 2006/0195325 A1 | 8/2006 | Tateson | |
| 2006/0212361 A1 | 9/2006 | Perkowski | |
| 2006/0218148 A1 | 9/2006 | Weber | |
| 2006/0235764 A1 | 10/2006 | Bamborough | |
| 2007/0016463 A1 | 1/2007 | Borders | |
| 2007/0022020 A1 | 1/2007 | Bernstein | |
| 2007/0033059 A1 | 2/2007 | Adkins | |
| 2007/0035619 A1 | 2/2007 | Yoon | |
| 2007/0055580 A1 | 3/2007 | Woodward | |
| 2007/0088805 A1 | 4/2007 | Cyster | |
| 2007/0112612 A1 | 5/2007 | Dollens | |
| 2007/0112647 A1 | 5/2007 | Borders | |
| 2007/0124110 A1 | 5/2007 | Tung | |
| 2007/0124721 A1 | 5/2007 | Cowing | |
| 2007/0125851 A1 | 6/2007 | Walker | |
| 2007/0136149 A1 | 6/2007 | Woodward | |
| 2007/0150368 A1 | 6/2007 | Arora | |
| 2007/0150370 A1 | 6/2007 | Staib | |
| 2007/0162353 A1 | 7/2007 | Borders | |
| 2007/0174089 A1 | 7/2007 | Koo | |
| 2007/0174144 A1 | 7/2007 | Borders | |
| 2007/0200873 A1* | 8/2007 | Hsu | 345/629 |
| 2007/0205596 A1 | 9/2007 | Mizuno | |
| 2007/0213948 A1 | 9/2007 | Hornstein | |
| 2007/0226082 A1 | 9/2007 | Leal | |
| 2007/0228169 A1 | 10/2007 | Kenney | |
| 2007/0250403 A1 | 10/2007 | Altschuler | |
| 2007/0250478 A1 | 10/2007 | Copperman | |
| 2007/0250492 A1 | 10/2007 | Angel | |
| 2007/0260520 A1 | 11/2007 | Jha | |
| 2007/0282693 A1 | 12/2007 | Staib | |
| 2007/0299740 A1 | 12/2007 | Kar | |
| 2007/0299784 A1 | 12/2007 | Kar | |

OTHER PUBLICATIONS

GeoExpress Tools, www.lizardtech.com/products/geo/tools.php, dated Mar. 17, 2006, accessed from Internet Archive on Sep. 22, 2011.*

"Designing a virtual exhibition using Scalable Vector Graphics," by Dion Hoe-Lian Goh and Julie Chih-Ee Wang, Aslib Proceedings: New Information Perspectives, vol. 56, No. 3, 2004, pp. 144-155.*

W3C Geospatial Vocabulary, W3C Incubator Group Report, Oct. 23, 2007, www.w3.org/2005/Incubator/geo/XGR-geo-20071023/ (14 pages).

W3C Image Annotation on the Semantic Web, W3C Incubator Group Report Aug. 14, 2007, www.w3.org/2005/Incubator/mmsem/XGR-image-annotation20070814/ (33 pages).

Ace Media Visual Resources, Ace Media (FP6-001765), 2004 www.acemedia.org/aceMedia/reference/resource/index.html (2 pages) (referenced by W3C Image Annotation on the Semantic Web).

* cited by examiner

METHOD AND SYSTEM FOR MANAGING AND DISPLAYING PRODUCT IMAGES

CROSS REFERENCES TO OTHER APPLICATIONS

This application claims priority to U.S. Provisional patent application No. 60/819,456, filed Jul. 7, 2006, the contents of which are incorporated by reference.

FIELD OF THE INVENTION

This invention relates to product display. More specifically, it relates to a method and system displaying and managing images of consumer products.

BACKGROUND OF THE INVENTION

The display of consumer products in a retail environment is a very important. The display of consumer products in pre-determined formats creates desired shopping experience for a shopper and generate sales for a retailer.

Consumer products are typically placed in pre-determined formats on shelves based on categories (e.g., health and beauty, liquor, grocery, etc.) For a category, plural display tactics are determined. The display tactics include such tactics as shelf management, promotion, pricing, assortment, etc.

The consumer products displayed on a shelf includes an assortment of products. An assortment of products increases shopper interest, increases shopper satisfaction and provides a retailer with more sales. However, too large an assortment of products may frustrate a consumer lead to higher costs for a retailer.

Most consumer products are sold off shelves stores. Consumers can browse shelves and physically pick up a product, remove it from the shelf, read the label, etc. However, when products are virtually displayed on a web-site and sold via electronic commerce (e-commerce) such as via the Internet or other communications network, consumers have a totally different shopping experience.

There are several problems associated with virtually displaying consumer products on a web-site. One problem is that consumer products are typically displayed one or a few at a time on a web-site. This is much different shopping experience than seeing all products for a category of products displayed on a shelf at the same time.

Another problem is that all products in a category of products typically are not displayed at the same time. Many consumers don't remember product details, and sometimes even the product's actual name. Instead many consumers rely on a size, shape, color or other packaging feature of the product to effect its purchase.

Another problem is that consumer products are typically displayed with one or more digital images. However, the digital image may not include the whole product package to allow a consumer to make an appropriate choice. For example, the digital image of the product may not include packing information for the reverse or back of the product. Such a virtual display would prevent the consumer from checking the product ingredients, warning labels, etc.

Another problem is that there have been some attempts to display three-dimensional or other views of consumer products. For example, video images are often created that provide a 360 degree view of the product. However, such video images are typically large and slow to download and display.

However, these inventions still do not solve all of the problems associated with displaying consumer products. It would thus be desirable to a method and system for displaying and managing images of consumer products.

SUMMARY OF THE INVENTION

In accordance with preferred embodiments of the present invention, some of the problems associated with displaying products are overcome. A method and system for displaying and managing products is presented.

The method and system include a layout for plural selected consumer products is presented. An image of a shelf layout on which consumer products are displayed is created. The created image allows progressive resolution on the selected plural consumer products that appear in the image. The created image is displayed via a communications network. The created image provides a virtual shopping experience is similar to a shopping experience in an actual retail store.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Product Display and Management System

Figure 1:
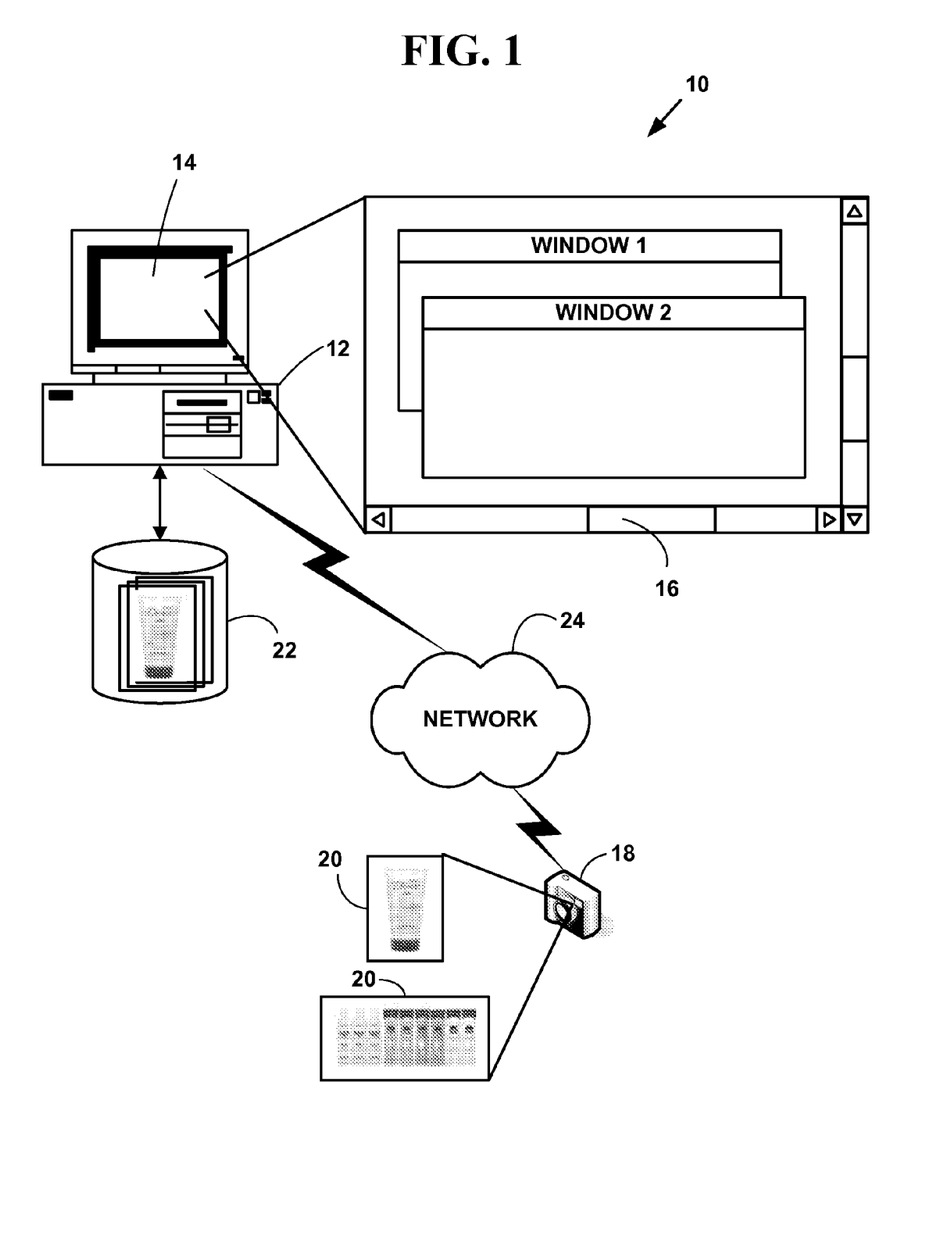
FIG. 1 is a block diagram illustrating a product display and management system.

FIG. 1 is a block diagram illustrating an exemplary product management and display system 10. The exemplary system 10 includes one or more network devices 12 with a display 14 (one of which is illustrated). The display 14 presents a windowed graphical user interface ("GUI") 16 with multiple windows to a user. The system 10 further includes a digital camera 18 (or analog camera) used to provide plural digital images 20 in various digital images or digital data formats. One or more databases 22 (one or which is illustrated) include consumer product information in various digital images or digital data formats. The databases 22 may be integral to a memory system on the computer 12 or in secondary storage such as a hard disk, floppy disk, optical disk, or other non-volatile mass storage devices. The computer 12 and the databases 22 may also be connected to an accessible via one or more communications networks 24.

The one or more network devices 12 may be replaced with client terminals in communications with one or more servers, or with personal digital/data assistants (PDA), laptop computers, mobile computers, Internet appliances, one or two-way pagers, mobile phones, or other similar desktop, mobile or hand-held electronic devices.

The communications network 24 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 24.

The communications network 24 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 24 may include one or more servers and one or more web-sites accessible by users to send and receive information useable by the one or more computers 12. The one ore more servers, may also include one or more associated databases for storing electronic information.

The communications network 24 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 19 and the present invention is not limited to TCP/UDP/IP.

The one or more database 22 include plural digital images 20 of consumer products taken with a camera such as a digital camera and stored in a variety of digital image formats including, raster, vector, bit-mapped, joint pictures expert group (JPEG), graphics interchange format (GIF), etc. The plural digital images 20 may be stored in a compressed format. The plural digital images may also be stored in progressive resolution format. However, the present invention is not limited to these digital image formats and other digital image or digital data formats can also be used to practice the invention.

As is known in the art, a "raster image" is an image composed of a rectangular grid of pixels. Each pixel contains a defined value about its color, size, and location in the image. An image composed of a rectangular grid of pixels. Each pixel contains a defined value about its color, size, and location in the image.

As is known in the art, a "vector image" is a graphic format that records geometric information to define the properties of an image with mathematical definitions. Angles, curves, lines, boxes, fills, and other properties are included in the vector format. In one embodiment, the vector images comprise one or more mathematical formulas and are not dependent on resolution of the digital image. In another embodiment, the vector images are dependent on resolution of the digital image.

As is known in the art, digital image "compression" is the translation of data in any format to a more compact form for storage or transmission. Compression reduces redundancy of the image data in order to be able to store or transmit data in an efficient form.

As is known in the art, a "progressive resolution" image format includes area of interest encoding, spatial relationship descriptor encoding, visual descriptor encoding or multi-resolution mosaic encoding of digital images including vector images.

The digital images 20 are typically obtained by photographing consumer and other types of products alone and in pre-determined shelf-set formats. As is known in the art, "shelf-sets"

An operating environment for the devices of the exemplary system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Digital Images

A digital image 20 typically includes an array, usually a rectangular matrix, of pixels. Each "pixel" is one picture element and is a digital quantity that is a value that represents some property of the image at a location in the array corresponding to a particular location in the image. Typically, in continuous tone black and white images the pixel values represent a gray scale value.

Pixel values for a digital image 20 typically conform to a specified range. For example, each array element may be one byte (i.e., eight bits). With one-byte pixels, pixel values range from zero to 255. In a gray scale image a 255 may represent absolute white and zero total black (or visa-versa).

Color images consist of three color planes, generally corresponding to red, green, and blue (RGB). For a particular pixel, there is one value for each of these color planes, (i.e., a value representing the red component, a value representing the green component, and a value representing the blue component). By varying the intensity of these three components, all colors in the color spectrum typically may be created.

However, many images do not have pixel values that make effective use of the full dynamic range of pixel values available on an output device. For example, in the eight-bit or byte case, a particular image may in its digital form only contain pixel values ranging from 100 to 150 (i.e., the pixels fall somewhere in the middle of the gray scale). Similarly, an eight-bit color image may also have RGB values that fall within a range somewhere in middle of the range available for the output device. The result in either case is that the output is relatively dull in appearance.

Exemplary Method for Displaying Products

Figure 2:
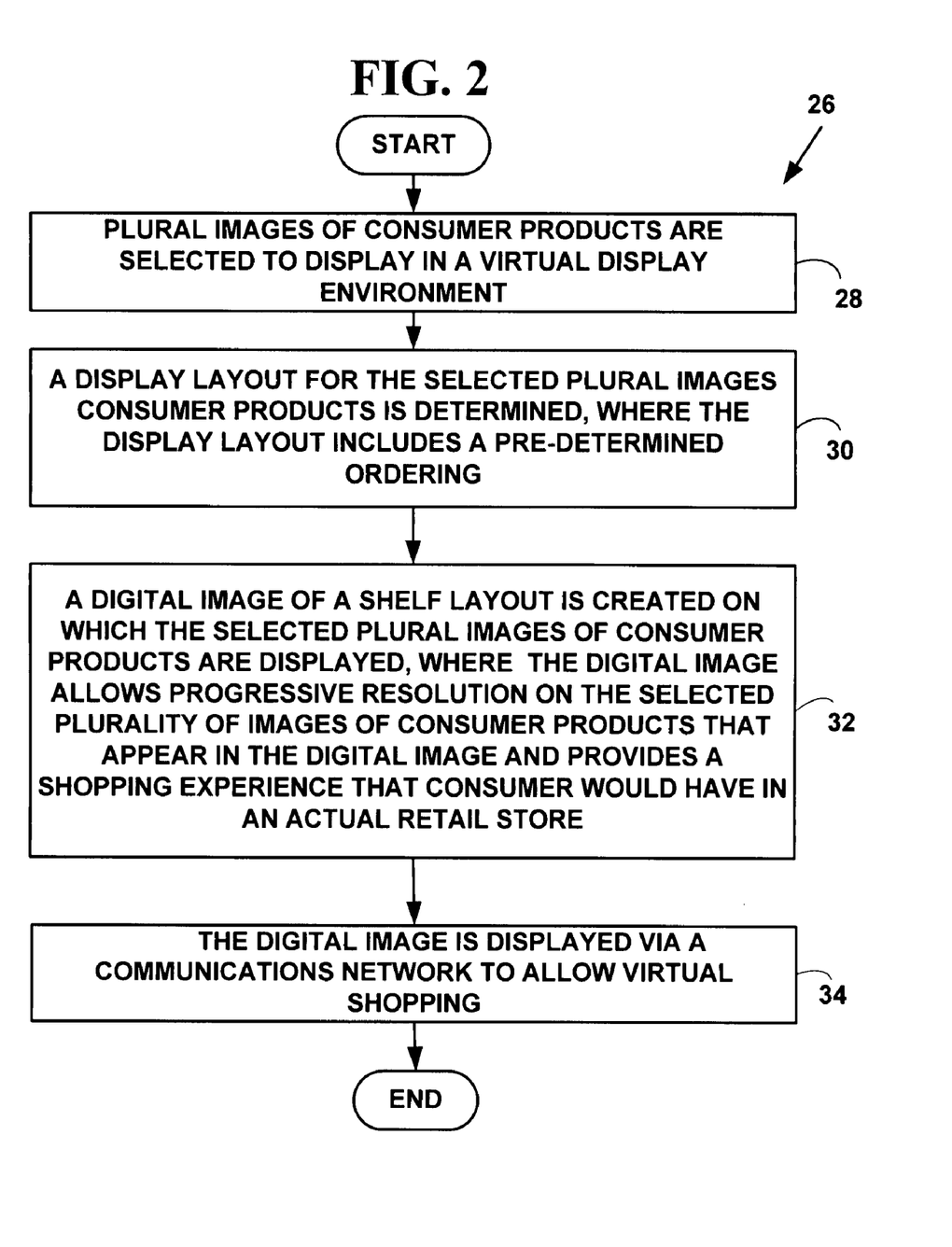
FIG. 2 is a flow diagram illustrating a method for displaying and managing products.

FIG. 2 is a flow diagram illustrating a Method 26 for displaying and managing products. At Step 28 plural images of consumer products are selected to display in a virtual display environment. At Step 30, a display layout for the selected plural images consumer products is determined. The display layout includes a pre-determined ordering. At Step 32, a digital image of a shelf layout is created on which the selected plural images of consumer products are displayed. The digital image includes one or more vector images overlaying one or more raster images. The digital image allows progressive resolution on the selected plural images of consumer products that appear in the digital image. The vector images include a plural electronic links to information associated with the consumer products. At Step 34, the digital image is displayed via a communications network to allow virtual shopping via the communications network.

Method 26 is illustrated with an exemplary embodiment. However, the present invention is not limited to such an embodiment other embodiments can also be used to practice the invention.

In such an exemplary embodiment at Step 28, plural images of plural consumer products are selected to display in a virtual display environment. For example, plural images of types of related (e.g., shampoo, conditioner, etc.) or unrelated consumer products in various product categories are selected such as skin care, personal cleansing, AP/DO, hair care, hair styling aids, hair colorants, feminine care (e.g., napkins, tampons, etc.) male care, (e.g., shaving, etc.), baby care (e.g., diapers and wipes, etc.), salty snacks, coffee, fabric care, hard-surface cleansers, floor systems, dish care, etc.

At Step 30, a layout for the selected plural consumer products is determined. The display layout includes a pre-determined ordering. The layout groups the images of the plural selected products by size, shape, color, other packaging characteristics, brand, etc.

In one embodiment, the pre-determined ordering includes an ordering that is used on actual shelves in retail stores. In another embodiment, the pre-determined ordering includes an ordering developed via live focus groups. In another embodiment, the pre-determined ordering includes an ordering based on package coloring or package size or package shape.

In one embodiment, the pre-determined ordering, layout and display of the digital image provides a viewer a shopping experience that is identical or nearly identical to that a consumer would have in an actual retail store. In most embodiments know in the art, the e-commerce and shopping sites on the Internet are not close and typically do not come anywhere close to that a consumer would have in an actual retail store.

At Step 32, a digital image of a shelf layout is created on which the selected plural images of consumer products are displayed. The digital image allows progressive resolution on the selected plurality of images of consumer products that appear in the digital image. The digital image of the self layout includes, but is not limited to, compilations of one or more very high resolution digital images of individual products, digital images taken of actual store shelves, or digital images of new store shelves that are displayed on in a virtual environment.

Using progressive resolution, a user can zoom in very close to the product image or zoom out to view the shelf in it's entirety. The created image is resolved as the user zooms in to a specific product and also resolves the image to clarity as the user zooms out to view the entire shelf.

In one embodiment, the created image includes vector image layering. Each digital image will have one or more vector images that overlay one or more raster images. These vector layers provide the user with electronic information, electronic links (e.g., HTML, XML, other electronic links, etc.) to other information including information about the company that produces the consumer product, ingredient information, options for product purchase, electronic coupons and sale information about products that are currently on sale. The links also allow a user to view the reverse side of the package.

In one embodiment, the created digital image is created as plural individual high resolution digital images are taken of an existing retail shelf to create a stitched panoramic photograph of the entire retail shelf from plural retail stores. Individual photos are taken of 4 foot wide by 7 foot high shelves. These individual images are then stitched together to form the category panoramic photos.

At Step 34, the created image is displayed via a communications network 24. For example, the create image may be displayed on a web-site on the Internet.

Figure 3:
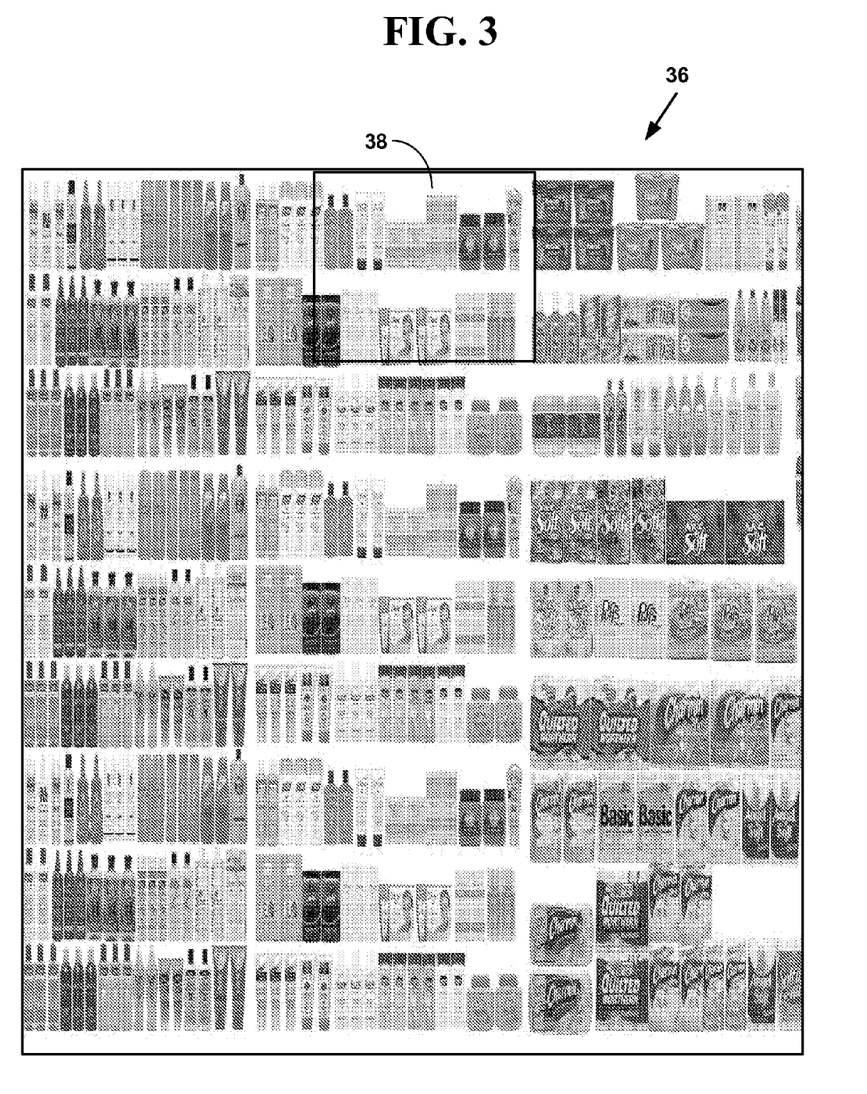
FIG. 3 is a block diagram illustrating an exemplary image of a shelf layout created with the method of FIG. 2.

FIG. 3 is a block diagram 36 illustrating an exemplary image of an actual shelf layout created with Method 26. FIG. 3 illustrates a first selected progressive resolution portion 38 of an actual digital image created to emulate an actual retail store shopping experience. The digital image 36 includes hair care and skin care products that are displayed on a shelf in a manner similar or identical to that of an actual retail store.

Figure 4:
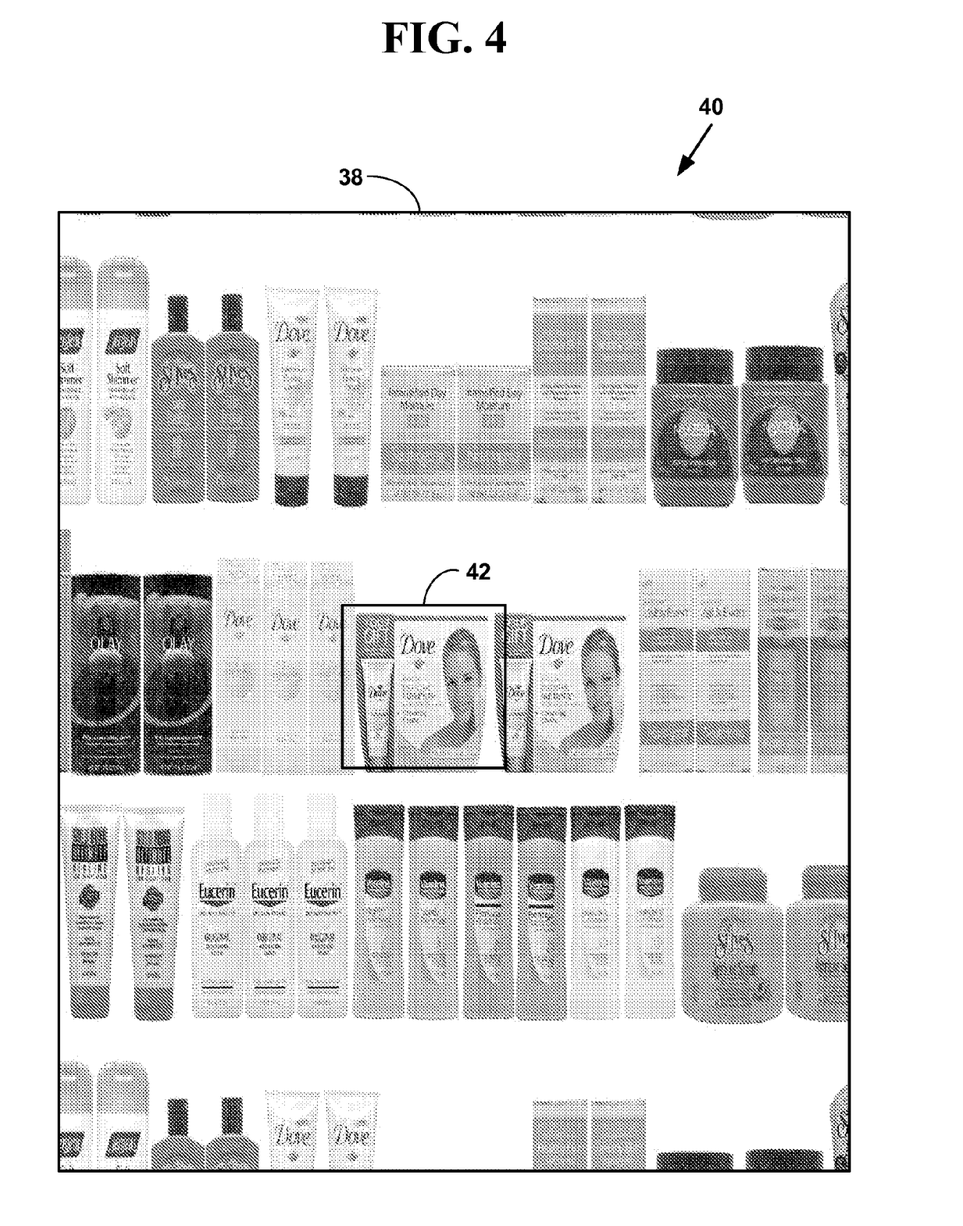
FIG. 4 is a block diagram illustrating an exemplary first progressive resolution portion of the shelf layout image of FIG. 3.

FIG. 4 is a block diagram 40 illustrating an exemplary progressive resolution portion of the shelf layout image of FIG. 3. FIG. 4 illustrates a second selected progressive resolution portion 42 selected within the first selected progressive resolution portion.

Figure 5:
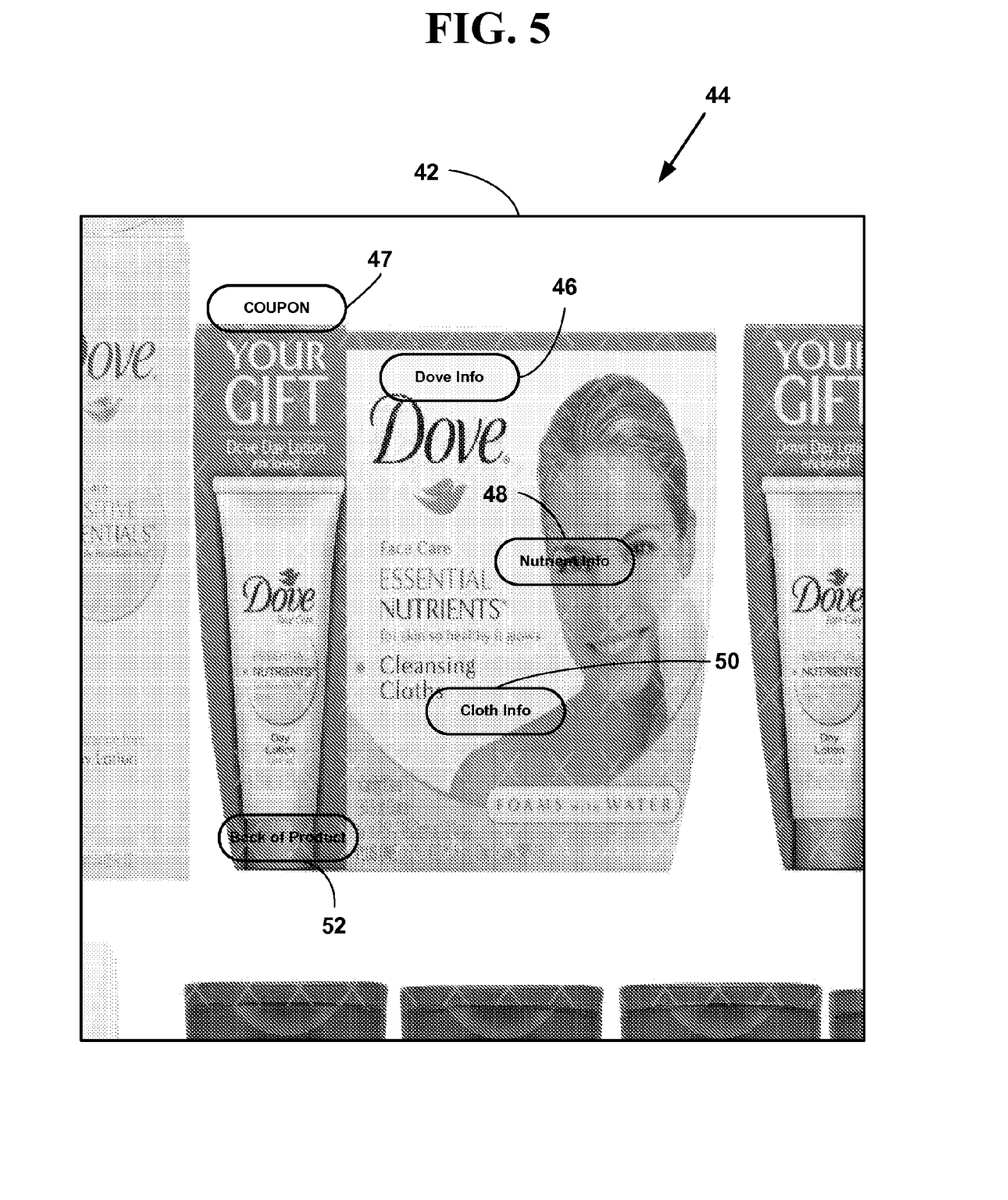
FIG. 5 is a block diagram illustrating details of a second selected progressive resolution portion of FIG. 4.

FIG. 5 is a block diagram 44 illustrating details of the second selected progressive resolution portion 42. FIG. 5 illustrates plural links 46, 47, 48, 50, 52 added to the progressive resolution portion 42 to provide addition information. For example, link 46 provides additional information on DOVE® products. Link 47 provides an electronic coupon that can be printed out and redeemed or used for an electronic purchase. Link 48 provides additional information on the essential nutrients included in the products. Link 50 provides additional information on the cleansing clothes. Link 52 provides a link to another progressive image with information on the reverse side of the product packaging.

Figure 6:
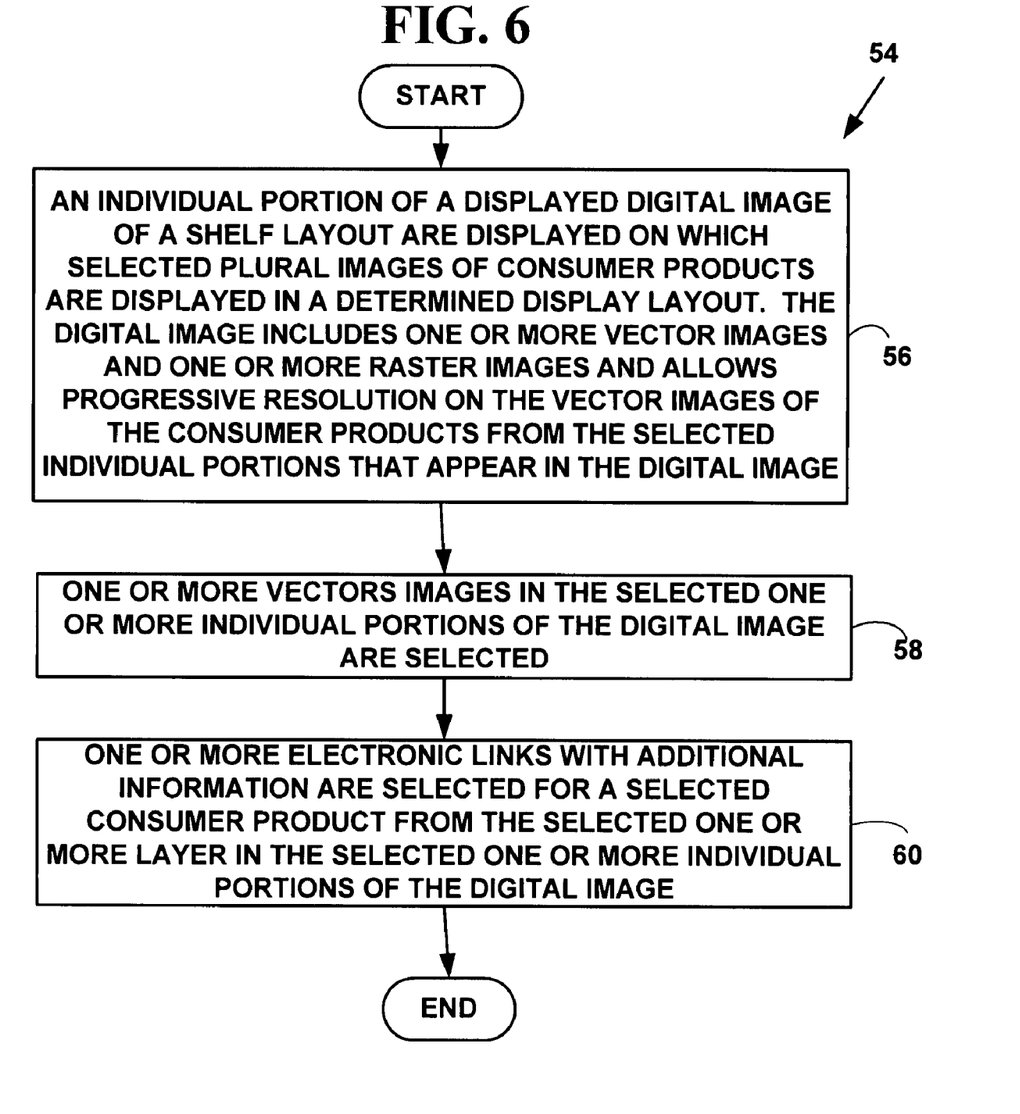
FIG. 6 is a flow diagram illustrating a method for displaying and managing products.

FIG. 6 is a flow diagram illustrating a Method 54 for displaying and managing products. At Step 56, an individual portion of a displayed digital image of a shelf layout is displayed on which selected plural images of consumer products are displayed in a determined display layout. The digital image includes one or more vector images and one or more raster images and allows progressive resolution on the vector images of the consumer products from the selected individual portions that appear in the digital image. At Step 58, one or more vectors images in the selected one or more individual portions of the digital image are selected. At Step 60, one or more electronic links with additional information are selected for a selected consumer product from the selected one or more layer in the selected one or more individual portions of the digital image.

Method 54 is illustrated with an exemplary embodiment. However, the present invention is not limited to such an embodiment other embodiments can also be used to practice the invention.

In such an exemplary embodiment, at Step 56, an individual portion 38, 42, 46, 48, 50, 52 of a displayed digital image of a shelf layout 36 are displayed on which selected plural images of consumer products are displayed in a determined display layout. The digital image includes one or more vector images and one or more raster images and allows progressive resolution on the vector images of the consumer products from the selected individual portions that appear in the digital image At Step 58, one or more vectors images in the selected one or more individual portions of the digital image are selected.

At Step 60, one or more electronic links with additional information are selected for a selected consumer product from the selected one or more layer in the selected one or more individual portions of the digital image.

At Steps 58 and 60, a seller will have the option of selecting which layers to make visible on the shelf image. Layer options include, but are not limited to: product purchase options, links to a product's web site, information on sales, price, advertising or other relevant information that the user might need in making a purchase decision about that product or products. The available options will also allow the seller to create their own customized on-line stores of products that have attributes important to them. Examples might be products that are all natural, products to combat aging, products for children, etc. Products sold domestically and internationally can be displayed side-by-side on a created image.

Figure 7:
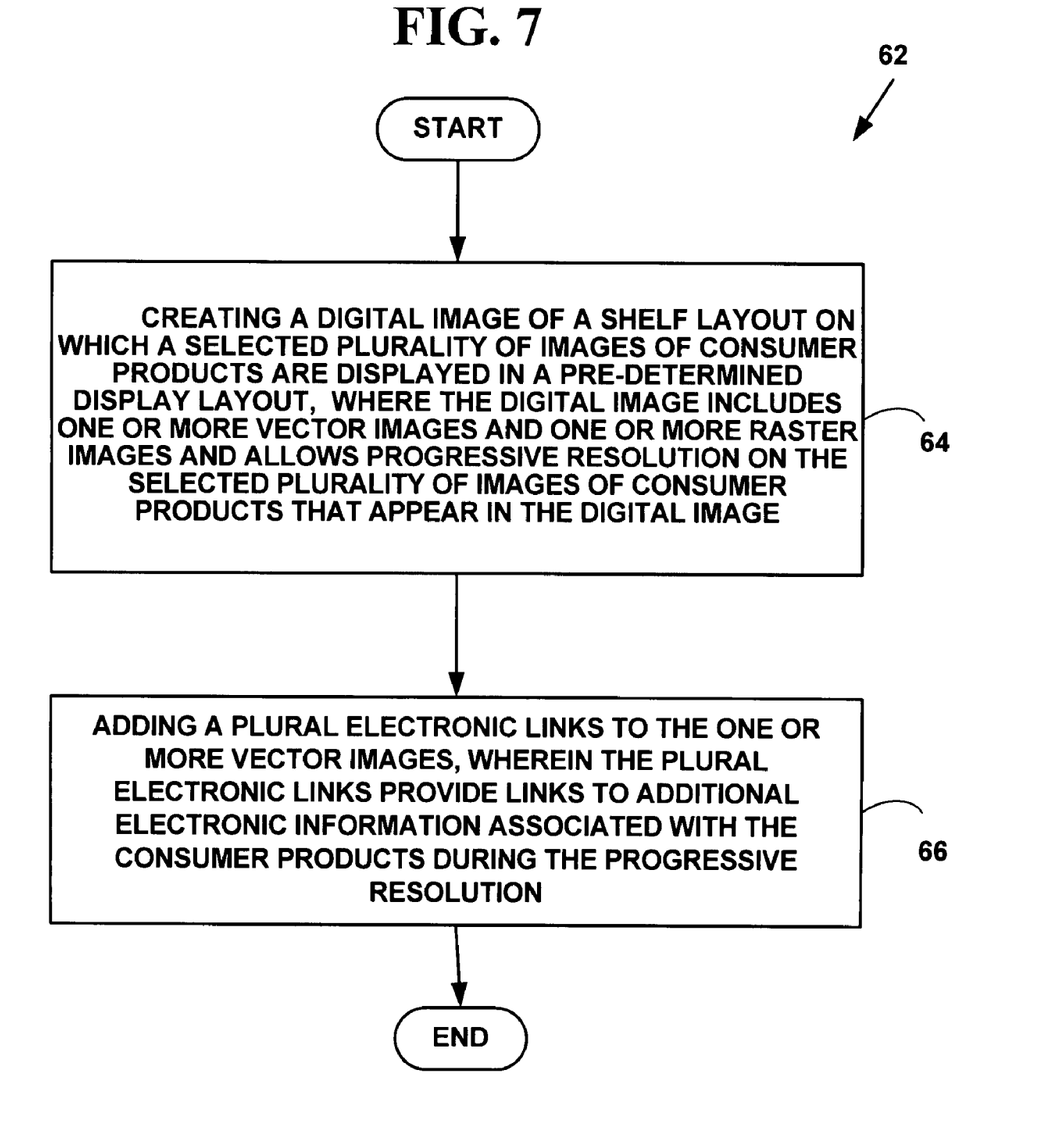
FIG. 7 is a flow diagram illustrating a method for creating images of products in a virtual shopping environment.

FIG. 7 is a flow diagram illustrating a Method 62 for creating images of products in a virtual shopping environment. At Step 64, a digital image of a shelf layout 36 is created on which selected plural images of consumer products are displayed in a pre-determined display layout. The digital image includes one or more vector images and one or more raster images and allows progressive resolution on the selected plural images of consumer products that appear in the digital image. At Step 66, plural electronic links are added to the one or more vector images. The plural electronic links provide links to additional electronic information associated with the consumer products during the progressive resolution.

Method 62 is illustrated with an exemplary embodiment. However, the present invention is not limited to such an embodiment other embodiments can also be used to practice the invention.

In such an exemplary embodiment, at Step 64, a digital image of a shelf layout 36 is created on which selected plural images of consumer products are displayed in a pre-determined display layout. The digital image includes one or more vector images and one or more raster images and allows progressive resolution on the selected plural images of consumer products that appear in the digital image.

At Step 66, plural electronic links 46, 48, 50, 52 are added to the one or more vector images. The plural electronic links provide links to additional electronic information associated with the consumer products during the progressive resolution.

The methods and system described herein create a digital image with progressive resolution that provides a virtual shopping experience is similar to a shopping experience in an actual retail store.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for displaying and managing products in a virtual display environment, comprising:

selecting a plurality of sets of raster images of consumer products from a non-transitory computer readable medium on a network device with one or more processors to display in a virtual display environment with a progressive resolution display;

creating a set of vector images for each selected set of raster images of the consumer products by selecting different portions of the selected set of raster images and by selecting different views of the selected set of raster images including different levels of detail from general details to specific details;

connecting each selected set of raster images of the consumer products with the created set of vector images, wherein the created set of vector images overlay the selected set of raster images as a plurality of vector image layers in a pre-determined image layer ordering;

determining a display layout for the selected plurality of sets of raster images of the consumer products, wherein the display layout includes a pre-determined display ordering for the plurality of selected sets of raster images of the consumer products;

selecting one or more sets of electronic information from the non-transitory computer readable medium that will be displayed in one or more pre-determined vector image layers in the plurality of vector image layers overlaying the plurality of selected sets of raster images of the consumer products, wherein the one or more sets of electronic information includes different types of electronic information including general electronic information and specific electronic information about the consumer products included in the plurality of selected sets of raster images of the consumer products;

adding one or more sets of electronic links to connect the selected one or more sets of electronic information to one or more individual vector images in the one or more pre-determined vector image layers, wherein the one or more sets of electronic links includes selected ones of the electronic links that link specific electronic information to one or more individual vector images in one or more vector image layers at a first set of layers in the plurality of vector image layers and wherein the one or more sets of electronic links includes other selected ones of the electronic links that link general electronic information to one or more other individual vector images in one or more other vector image layers at a second set of layers in the plurality of vector image layers;

creating in the non-transitory computer readable medium a multi-resolution mosaic (MRM) digital image including a plurality of layers of a shelf layout in the determined display layout by combining the created plurality of sets of vector images overlaying the plurality of selected sets of raster images of the consumer products, the selected one or more sets of electronic information, and the added one or more sets of electronic links;

providing the created MRM digital image for progressive resolution display of the created plurality of vector images in the plurality of vector image layers from the non-transitory computer readable medium from the network device via a communications network to allow virtual shopping via the communications network, thereby creating a customized on-line store of the consumer products;

displaying the created MRM digital image with the progressive resolution display, wherein the progressive resolution display allows displaying, zooming in and zooming out on selected portions of the created MRM digital image; and displaying during a first portion of the progressive resolution display only selected ones of the added one or more sets of electronic links in pre-determined layers in the plurality of vector image layers and allowing linking to the only selected ones of the one or more sets of electronic information from different vector image layers in the plurality of vector image layers during the first portion of the progressive resolution display of the created MRM digital image;

displaying during a second portion of the progressive resolution display only one or more sets of electronic links added to a current vector image layer currently being viewed in the created MRM digital image, wherein the second portion of progressive resolution display allows display of different sets of electronic links from the one or more added sets of electronic links providing current electronic links to selected electronic information including general electronic information and specific electronic information as different current vector images are viewed in the plurality of vector image layers.

2. The method of claim 1 wherein the consumer products include raster images of related or unrelated consumer products in selected product categories including skin care, personal cleansing, hair care, hair styling aids, hair colorants, feminine care, male care, baby care, salty snacks, coffee, fabric care, hard-surface cleansers, floor systems, or dish care.

3. The method of claim 1 wherein selected ones of the added one or more sets of electronic links provide a user with access to one or more different types of electronic brand information or electronic advertising information for the consumer products.

4. The method of claim 1 wherein selected ones of the added sets of electronic links provide a user with electronic product information including product information on a reverse side of product package, electronic links to other information including company information, ingredient information, options for product purchase, electronic coupons, advertising information and sale information about selected products which are currently on sale.

5. The method of claim 1 wherein the raster images include high resolution digital raster images of the consumer products.

6. The method of claim 1 wherein the vector images used in the progressive resolution display are stored in a format that includes a digital image storage format including area of interest encoding, spatial relationship descriptor encoding, visual descriptor encoding or multi-resolution mosaic encoding of the raster images of the consumer products in the created MRM digital image.

7. The method of claim 1 wherein the pre-determined ordering of the display layout includes an ordering that is used on actual shelves in retail stores, an ordering developed via live focus groups, or an ordering based on package coloring or package size or package shape.

8. The method of claim 1 further comprising creating a virtual shopping experience via the communications network, wherein the virtual shopping experience emulates a real shopping experience in an actual retail store by providing the progressive resolution display of the created MRM digital image.

9. The method of claim 1 further comprising:
selecting an individual portion of the displayed created MRM digital image of the shelf layout on which the selected plurality of sets of raster images of the consumer products are displayed in the pre-determined display layout;
selecting one or more vector images at one or more vector image layers in the plurality of vector image layers in the selected individual portion of the displayed created MRM digital image as it is displayed in the progressive resolution display;
selecting one or more electronic links from the selected one or more vector images from the one or more vector image layers in the plurality of vector image layers with additional electronic information for a selected consumer product from the selected one or more vector image layers in the selected one or more individual portions of the displayed MRM digital image; and
displaying from the non-transitory computer readable medium from the network device electronic information from selected sets of electronic information based on the selected one or more electronic links.

10. The method of claim 9 wherein the selected one or more electronic links provide a user with electronic product information including product information on a reverse side of product package, electronic links to other information including company information, ingredient information, options for product purchase, electronic coupons, advertising information and sale information about selected products which are currently on sale.

11. The method of claim 9 wherein the raster images include high resolution digital raster images of the consumer products.

12. The method of claim 9 further comprising:
creating a virtual shopping experience with the created MRM digital image via the communications network, wherein the virtual shopping experience emulates a real shopping experience in an actual retail store by providing the progressive resolution display of the created MRM digital image.

13. The method of claim 9 wherein the pre-determined display layout includes an ordering that is used on actual shelves in retail stores, an ordering developed via live focus groups, or an ordering based on package coloring or package size or package shape.

14. The method of claim 1 further comprising:
selecting one or more vector image layers from the plurality of vector image layers in the created MRM digital image in the pre-determined display layout;
adding electronic display information from selected ones of the selected sets of electronic information to the selected one or more vector image layers, wherein the electronic display information is displayed over a whole vector image layer or a portion of a vector image layer in the created MRM digital image; and
displaying from the non-transitory computer readable medium from the network device via the communications network the created MRM digital image with the added electronic display information with the progressive resolution display, thereby displaying the added electronic display information over the whole vector image layer or the portion of the vector image layer in the created MRM digital image during the progressive resolution display of the created MRM digital image.

15. The method of claim 14 wherein the added electronic display information includes electronic advertising or brand information for a selected group of the consumer products.

16. The method of claim 1 further comprising:
selecting a display set of vector image layers from the plurality of vector image layers in the created MRM digital image; and
displaying only the selected display set of vector image layers from the plurality of vector image layers in the created MRM digital image during progressive resolution display of the created MRM digital image.

17. The method of claim 1 wherein at least one first vector image layer in the plurality of vector image layers in the MRM digital image includes one or more electronic links to electronic brand information, at least one second vector image layer in the multi-resolution mosaic digital image includes one or more electronic links to electronic product information, and at least one third vector image layer in the MRM digital image includes electronic package information for one or more consumer products that appear in the selected plurality of sets of raster images of the consumer products.

18. A non-transitory computer readable medium having stored therein a set of software instructions for causing one or more processors to execute the steps of:
selecting a plurality of sets of raster images of consumer products from a non-transitory computer readable medium on a network device with one or more processors to display in a virtual display environment with a progressive resolution display;
creating a set of vector images for each selected set of raster images of the consumer products by selecting different portions of the selected set of raster images and by selecting different views of the selected set raster images including different levels of detail from general details to specific details;
connecting each selected set of raster images of the consumer products with the created set of vector images, wherein the created set of vector images overlay the selected set of raster images as a plurality of vector image layers in a pre-determined image layer ordering;
determining a display layout for the plurality of selected sets of raster images of the consumer products, wherein the display layout includes a pre-determined display ordering for the plurality of selected sets of raster images of the consumer products;
selecting one or more sets of electronic information from the non-transitory computer readable medium that will be displayed in one or more pre-determined vector image layers in the plurality of vector image layers overlaying the plurality of selected sets of raster images of the consumer products, wherein the one or more sets of electronic information includes different types of electronic information including general electronic information and specific electronic information about the consumer products included in the plurality of selected sets of raster images of the consumer products;
adding one or more sets of electronic links to connect the selected one or more sets of electronic information to one or more individual vector images in the one or more pre-determined vector image layers, wherein the one or more sets of electronic links includes selected ones of the electronic links that link specific electronic information to one or more individual vector images in one or more vector image layers at a first set of layers in the plurality of vector image layers and wherein the one or more sets of electronic links includes other selected ones of the electronic links that link general electronic information to one or more other individual vector images in one or more other vector image layers at a second set of layers in the plurality of vector image layers;
creating in the non-transitory computer readable medium a multi-resolution mosaic (MRM) digital image including a plurality of layers of a shelf layout in the determined display layout by combining the created plurality of sets of vector images overlaying the plurality of selected sets of raster images of the consumer products, the selected one or more sets of electronic information, and the added one or more sets of electronic links; and
providing the created MRM digital image for progressive resolution display of the created plurality of vector images in the plurality of vector image layers from the non-transitory computer readable medium from the network device via a communications network to allow virtual shopping via the communications network, thereby creating a customized on-line store of the consumer products;
displaying the created MRM digital image with the progressive resolution display, wherein the progressive resolution display allows displaying, zooming in and zooming out on selected portions of the created MRM digital image; and
displaying during a first portion of the progressive resolution display only selected ones of the added one or more sets of electronic links in pre-determined layers in the plurality of vector image layers and allowing linking to the only selected ones of the one or more sets of electronic information from different vector image layers in the plurality of vector image layers during the first portion of the progressive resolution display of the created MRM digital image;
displaying during a second portion of the progressive resolution display only these one or more sets of electronic links added to a current vector image layer currently being viewed in the created MRM digital image, wherein the second portion of the progressive resolution display allows display of different sets of electronic links from the one or more added sets of electronic links providing current electronic links to selected electronic information including general electronic information and specific electronic information as different current vector images are viewed in the plurality of vector image layers.

19. A system for creating, managing and display images of products in a virtual shopping environment, comprising in combination:

a network device with one or more processors;
a display device for the network device;
the network device configured for:
  selecting a plurality of sets of raster images of consumer products from a non-transitory computer readable medium to display in a virtual display environment with a progressive resolution display;
  creating a set of vector images for each selected set of raster images of the consumer products by selecting different portions of the selected set of raster images and by selecting different views of the selected set of raster images including different levels of detail from general details to specific details;
  connecting each selected set of raster images of the consumer products with the created set of vector images, wherein the created set of vector images overlay the selected set of raster images as a plurality of vector image layers in a pre-determined image layer ordering;
  determining a display layout for the plurality of selected sets of raster images of the consumer products, wherein the display layout includes a pre-determined display ordering for the plurality of selected sets of raster images of the consumer products;
  selecting one or more sets of electronic information from the non-transitory computer readable medium that will be displayed in one or more pre-determined vector image layers in the plurality of vector image layers overlaying the plurality of selected sets of raster images of the consumer products, wherein the one or more sets of electronic information includes different types of electronic information including general electronic information and specific electronic information about the consumer products included in the plurality of selected sets of raster images of the consumer products;
  adding one or more sets of electronic links to connect the selected one or more sets of electronic information to one or more individual vector images in the one or more pre-determined vector image layers, wherein the one or more sets of electronic links includes selected ones of the electronic links that link specific electronic information to one or more individual vector images in one or more vector image layers at a first set of layers in the plurality of vector image layers and wherein the one or more sets of electronic links includes other selected ones of the electronic links that link general electronic information to one or more other individual vector images in one or more other vector image layers at a second set of layers in the plurality of vector image layers;
  creating in the non-transitory computer readable medium a multi-resolution mosaic (MRM) digital image including a plurality of layers of a shelf layout in the determined display layout by combining the created plurality of sets of vector images overlaying the plurality of selected sets of raster images of the consumer products, the selected one or more sets of electronic information, and the added one or more sets of electronic links; and
  providing the created MRM digital image for progressive resolution display of the created plurality of vector images in the plurality of vector image layers from the non-transitory computer readable medium from the network device via a communications network to allow virtual shopping via the communications network, thereby creating a customized on-line store of the consumer products;
  displaying on the display device the created MRM digital image with the progressive resolution display, wherein the progressive resolution display allows displaying, zooming in and zooming out on selected portions of the created MRM digital image; and
  displaying during a first portion of the progressive resolution display only selected ones of the added one or more sets of electronic links in pre-determined layers in the plurality of vector image layers and allowing linking to the only selected ones of the one or more sets of electronic information from different vector image layers in the plurality of vector image layers during the first portion of the progressive resolution display of the created MRM digital image;
  displaying during a second portion of the progressive resolution display only one or more sets of electronic links added to a current vector image layer currently being viewed in the created MRM digital image, wherein the second portion of the progressive resolution display allows display of different sets of electronic links from the one or more added sets of electronic links providing current electronic links to selected electronic information including general electronic information and specific electronic information as different current vector images are viewed in the plurality of vector image layers.

* * * * *